United States Patent
Jung et al.

(10) Patent No.: US 7,149,431 B2
(45) Date of Patent: Dec. 12, 2006

(54) SELF-SEEDED FABRY-PEROT LASER DEVICE FOR WAVELENGTH DIVISION MULTIPLEXING SYSTEM

(75) Inventors: Dae-Kwang Jung, Suwon-shi (KR); Tae-Sung Park, Suwon-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 459 days.

(21) Appl. No.: 10/628,005

(22) Filed: Jul. 25, 2003

(65) Prior Publication Data

US 2004/0071399 A1    Apr. 15, 2004

(30) Foreign Application Priority Data

Oct. 15, 2002  (KR) .................. 10-2000-0062820

(51) Int. Cl.
*H04B 10/00* (2006.01)
(52) U.S. Cl. ......................................... 398/138
(58) Field of Classification Search ............. 398/138, 398/196
See application file for complete search history.

(56) References Cited

U.S. PATENT DOCUMENTS

| | | | |
|---|---|---|---|
| 4,749,878 A * | 6/1988 | Snyder et al. .............. 327/114 |
| 5,212,711 A * | 5/1993 | Harvey et al. ............... 372/94 |
| 5,646,762 A * | 7/1997 | Delavaux et al. ........... 398/180 |
| 5,691,989 A * | 11/1997 | Rakuljic et al. .............. 372/20 |
| 5,917,633 A * | 6/1999 | Gambini et al. .............. 398/32 |
| 6,067,181 A * | 5/2000 | Mizrahi ....................... 398/196 |
| 6,078,418 A * | 6/2000 | Hansen et al. .............. 398/147 |
| 6,445,478 B1 * | 9/2002 | Shimizu et al. ............. 398/192 |
| 6,744,792 B1 * | 6/2004 | Tayebati ....................... 372/32 |
| 6,845,108 B1 * | 1/2005 | Liu et al. ....................... 372/20 |
| 2001/0004290 A1 * | 6/2001 | Lee et al. ..................... 359/124 |
| 2001/0019562 A1 * | 9/2001 | Kai et al. ...................... 372/20 |
| 2003/0080899 A1 * | 5/2003 | Lee et al. ..................... 342/368 |
| 2004/0101305 A1 * | 5/2004 | Jung et al. ..................... 398/71 |

* cited by examiner

*Primary Examiner*—Deandra M. Hughes
(74) *Attorney, Agent, or Firm*—Cha & Reiter, L.L.C.

(57) ABSTRACT

Disclosed is a Fabry-Perot laser device connected with an optical transmission link. The device comprises an optical circulator for forming an optical waveguide loop and circulating light through the optical waveguide loop and for outputting light from the optical waveguide loop through an external port; an optical fiber amplifier located on the optical waveguide loop and for amplifying the light circulating in the optical waveguide loop; a laser light source connected with the exterior port and being self-seeded by the light inputted through the exterior port and for outputting wavelength-locked light to the exterior port; and, a first splitter located on the loop for splitting a portion of the circulating light and for outputting the split-off light to the optical transmission link.

12 Claims, 11 Drawing Sheets

SELF-SEEDED FABRY-PEROT LASER DEVICE FOR WAVELENGTH DIVISION MULTIPLEXING SYSTEM

CLAIM OF PRIORITY

This application claims priority to an application entitled "Self-seeded Fabry-Perot Laser Device For Wavelength Division Multiplexing System," filed with the Korean Intellectual Property Office on Oct. 15, 2002 and assigned Ser. No. 2002-62820, the contents of which are hereby incorporated by reference.

BACKGROUND OF THE INVENTION

1. Field of the Invention

The present invention relates to a wavelength-division-multiplexed (WDM) optical transmission system, and more particularly to a light source employed in the WDM optical system.

2. Description of the Related Art

A wavelength-division-multiplexed passive optical network (PON) allocates a wavelength for each of the subscribers, thus offering a high-speed broadband communication service. In particular, communication confidentiality is ensured, and a required additional communication service or an expansion in the communication capacity can be accommodated easily to the subscribers. In addition, an increase in the number of subscribers can be serviced easily by assigning a new inherent wavelength to each new subscriber. Despite these advantages, as a light source having a specific wavelength and an additional wavelength stabilizing circuit for stabilizing the light source are required at the central office (CO) and for each of the subscriber stages, the WDM PON is expensive to implement. Thus, there is a need to develop a cost effective WDM light source for the WDM PON. A distributed feedback laser array (DFB laser array), a multi-frequency laser (MFL), a spectrum-sliced light source, and a wavelength-locked Fabry-Perot laser with incoherent light, etc., have been suggested as WDM light sources. The spectrum-sliced light source, which is being actively researched, can offer a number of wavelength-division channels by spectrum-slicing a broadband optical signal with an optical filter or a waveguide grating router (WGR). As such, this type of light source does not require the wavelength selectiveness and the wavelength stabilization.

A light emitting diode (LED), a super-luminescent diode (SLD), a Fabry-Perot laser (FP laser), a fiber amplifier light source, and an ultra short pulse light source, etc., have been also suggested as spectrum-sliced light sources. The wavelength-locked Fabry-Perot laser with incoherent light is configured to spectrum-slices a broad bandwidth optical signal, which has been produced from an incoherent light source, such as a light emitting diode or a fiber amplifier light source, using an optical filter or waveguide grating router, then uses a wavelength-locked signal for transmission, which is outputted by inputting the sliced signal into a Fabry-Perot laser that is not equipped with an isolator. When a spectrum-sliced signal having an output greater than a predetermined value is inputted into the Fabry-Perot laser, the Fabry-Perot laser produces and outputs only a wavelength equal to that of the inputted spectrum-sliced signal.

Meanwhile, each of the distributed feedback (DFB) laser array and the multi-frequency laser (MFL) requires a complicated manufacturing process and utilizes an expensive device that requires a light source having an accurate wavelength selectiveness and wavelength stabilization for wavelength division multiplexing. Although the light emitting diode (LED) and the super-luminescent diode (SLD) have a very broad light bandwidth are inexpensive, they are only suitable for a light source for an upward signal, which has a low modulation rate compared to a downward signal, as their modulation bandwidths and outputs are low.

The Fabry-Perot laser is an inexpensive, high-power device. However, it has disadvantages in that it cannot offer many wavelength-division channels due to its narrow bandwidth and that in the case of modulating and transmitting a spectrum-sliced signal with high speed, a performance degradation caused by a mode partition noise is great.

The ultra short pulse light source is coherent and has a very broad spectrum band. However, it is difficult to function as light source as the stability of the oscillated spectrum is poor and the pulse width is no more than several ps.

As an alternative to the above-described light sources, a spectrum-sliced, fiber amplified light source has been introduced to spectrum-slices an amplified spontaneous emission light (ASE light) produced from the fiber amplifier. The spectrum-spliced light source is capable of offering many high-power wavelength-division channels. However, it must use an expensive, independent external modulator, such as a $LiNbO_3$ modulator, so that each channel may transmit different data. In contrast, the wavelength-locked Fabry-Perot laser with incoherent light directly modulates the Fabry-Perot laser depending on the data signal, thus can more economically transmit the data. However, the Fabry-Perot laser requires input of a broad bandwidth, high-power incoherent light signal so that the Fabry-Perot laser may output a wavelength-locked signal that is suitable for a high-speed, long distance transmission. And, it is impossible to make a long distance transmission due to a dispersion effect of the optical fiber as the signal of the Fabry-Perot laser, which is self-seeded and outputs when an incoherent light having a bandwidth broader than a mode interval of the output signal of the Fabry-Perot laser is inputted for high speed transmission, becomes a signal with a plurality of wavelengths distributed depending on the mode interval, Accordingly, there is a need for an improved WDM light source that can address the drawbacks described in the preceding paragraphs.

SUMMARY OF THE INVENTION

One aspect of the present invention is to provide an economical wavelength-division-multiplexed light source capable of ensuring a side mode suppression ratio and producing an output that is adequate enough for high speed data transmission.

According to another aspect of the invention, there is provided a self-seeded Fabry-Perot laser device connected with an optical transmission link, and the self-seeded Fabry-Perot laser device includes: an optical circulator for forming an optical waveguide loop to circulate the light that has been inputted through an exterior port in the optical waveguide loop and for outputting the light from the optical waveguide loop through the external port; an optical fiber amplifier located on the optical waveguide loop for amplifying the light circulating in the optical waveguide loop; a laser light source connected with the exterior port and self-seeded by the light inputted through the exterior port and for outputting wavelength-locked light to the exterior port; and, a first splitter located on the loop for splitting off a portion of the circulating light and for outputting the split-off light to the optical transmission link.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. For the purposes of clarity and simplicity, a detailed description of known functions and configurations incorporated herein will be omitted as it may make the subject matter of the present invention rather unclear.

Figure 1:
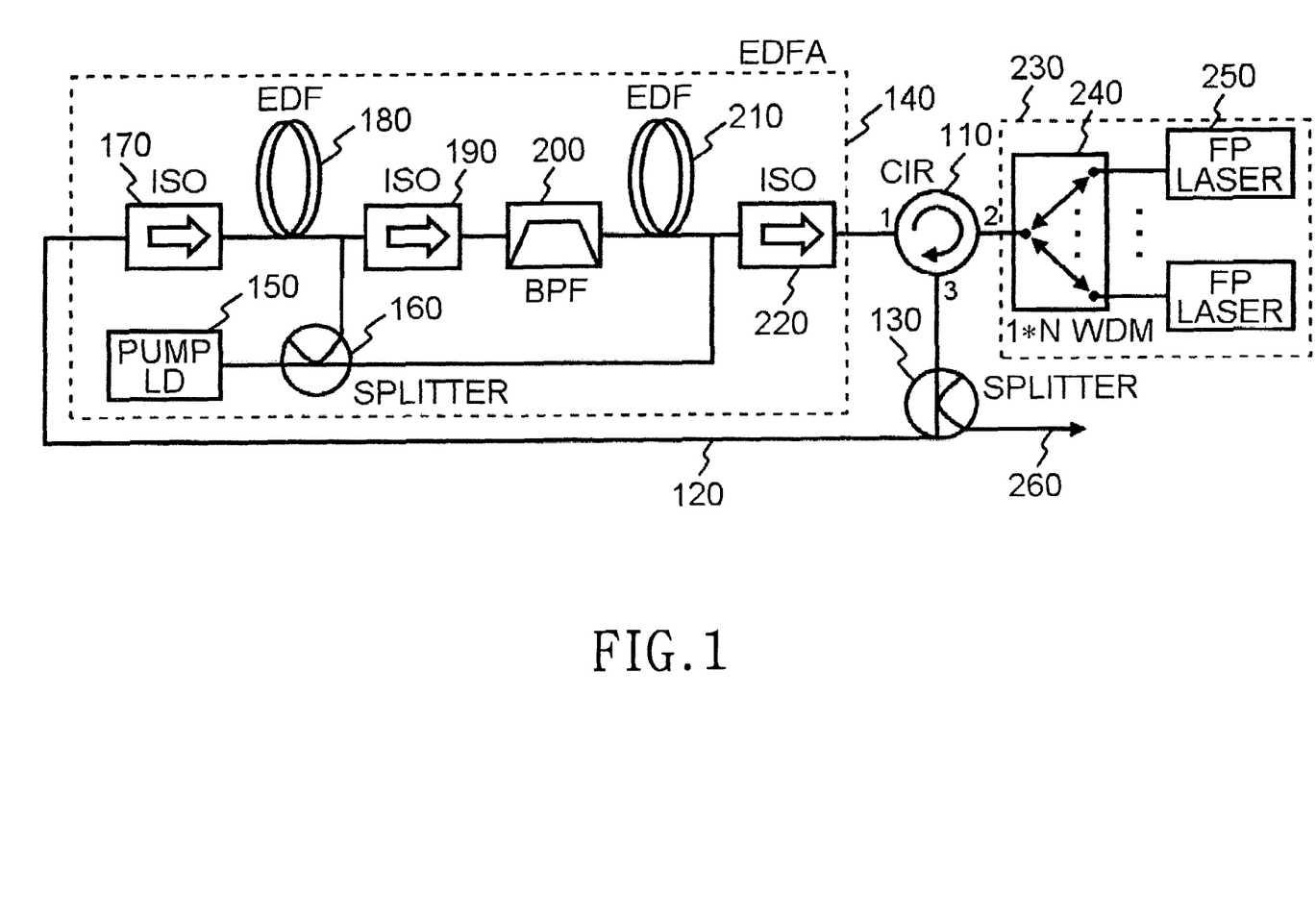
FIG. 1 shows a construction of a wavelength division multiplexed, self-seeded Fabry-Perot laser device in accordance with a preferred embodiment of the present invention.

FIG. 1 shows a construction of a wavelength division multiplexed, self-seeded Fabry-Perot laser device in accordance with a preferred embodiment of the present invention. As shown, the Fabry-Perot laser device includes an optical circulator 110, an optical fiber amplifier 140, a laser light source 230, and a first splitter 130 and is configured to output a wavelength division multiplexed, optical signal to an optical transmission link 260.

The optical circulator 110 is provided with first to third ports, and the optical signal outputted to the third port is inputted into the first port via the first splitter 130 and the optical fiber amplifier 140. The path in which the optical signal circulates from the third port to the first port forms an optical waveguide loop 120. The optical signal inputted into the first port is outputted to the second port, and the optical signal inputted through the second port is outputted to the third port.

The optical fiber amplifier 140 is located on the loop 120 and is configured to amplify the circulating optical signal. The amplifier 140 comprises first to third optical isolators 170, 190, and 220, first and second amplifying optical fibers 180 and 210, a pumping light source 150, a second splitter 160, and a band-pass filter (BPF) 200.

Both the first and second amplifying optical fibers 180 and 210 amplify the circulating optical signal using a stimulated emission of the rare earth elements and positioned to be serially connected on the loop 120. In the embodiment, erbium-doped fibers (EDF) maybe used as the first and second amplifying optical fibers 180 and 210.

The pumping light source 150 outputs a pumping light having a wavelength preset for pumping the first and second amplifying optical fibers 180 and 210. In the embodiment, a laser diode can be used as the pumping light source 150.

The second splitter 160 splits off a portion of the pumping light and links the splitted light and the non-splitted pumping light to the first and second amplifying optical fibers 180 and 210, respectively. As the second splitter 160 links the pumping light to the posterior ends of the first and second amplifying optical fibers 180 and 210, the first and second amplifying optical fibers 180 and 210 is rearwards (or reversely) pumped.

The band-pass filter 200 is placed between the first and second amplifying optical fibers 180 and 210 and has a bandwidth equal to that of the circulating optical signal, thereby eliminating an amplified spontaneous emission noise (ASE noise) deviating from the bandwidth. After eliminating the ASE noise, the second amplifying optical fiber 210 amplifies the optical signal again, thus allowing an increase in the output of the optical signal.

The first to third optical isolators 170, 190, and 220 each allows the circulating optical signal to pass therethrough, while b locking any light propagating in the reverse direction. These optical isolators are located between the first splitter 130 and the first amplifying optical fiber 180, between the first amplifying optical fiber 180 and the band-pass filter 200, and between the second amplifying optical fiber 210 and the optical circulator 110, sequentially.

The laser light source 230 is connected to the second port of the optical circulator 110 and self-seeded by the optical signal inputted through the second port, and outputs wavelength-locked optical signal having the self-seeded wavelength to the second port. The laser light source 230 comprises a plurality of the Fabry-Perot lasers 250.

In order to facilitate an understanding of this invention, the characteristics of the wavelength-locking of the Fabry-Perot lasers 250 will be explained in conjunction with FIGS. 2–4 prior to closely looking at the construction of the laser light source 230.

Figure 2:
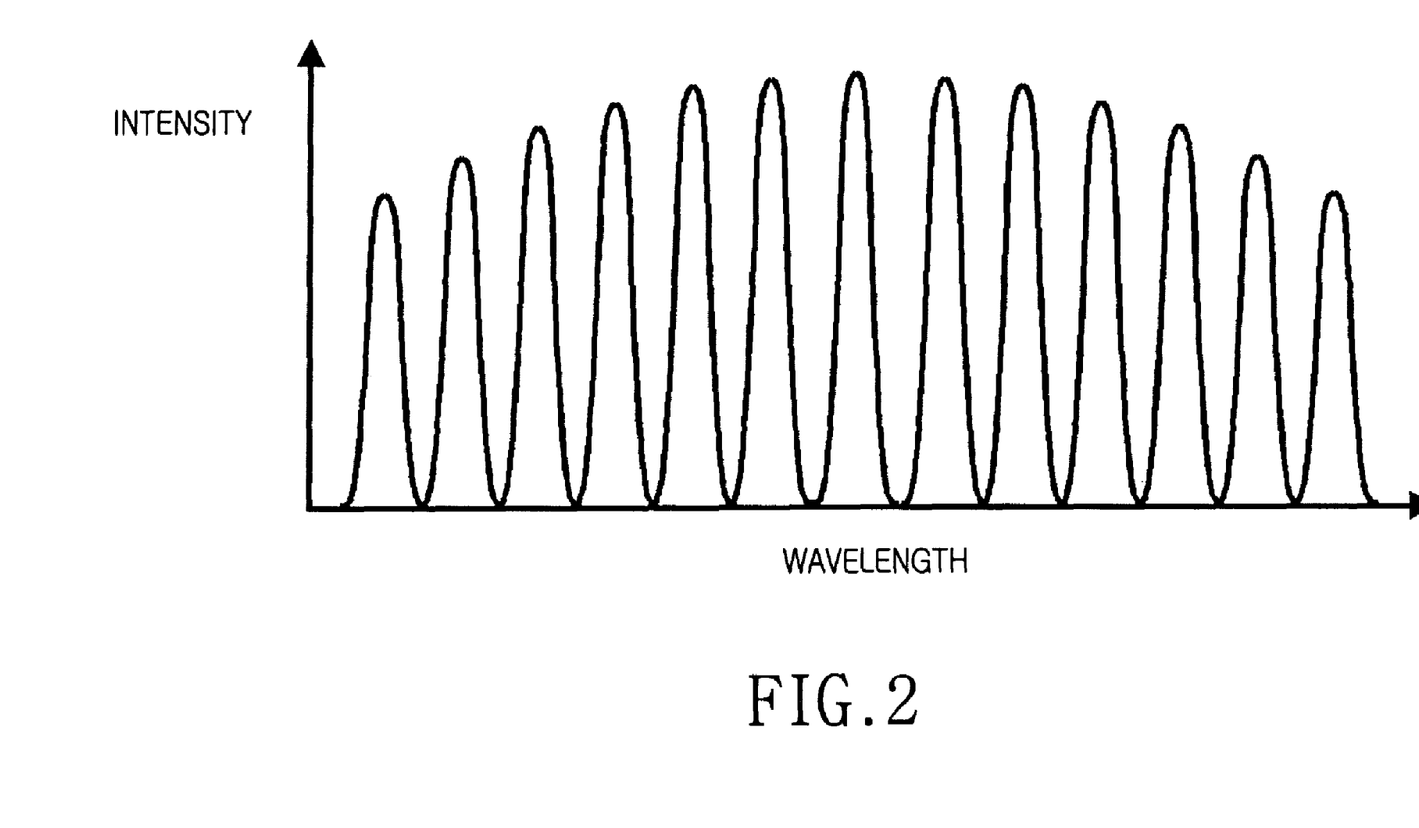
FIGS. 2 to 4 show a wavelength-locking of the Fabry-Perot laser.
Figure 3:
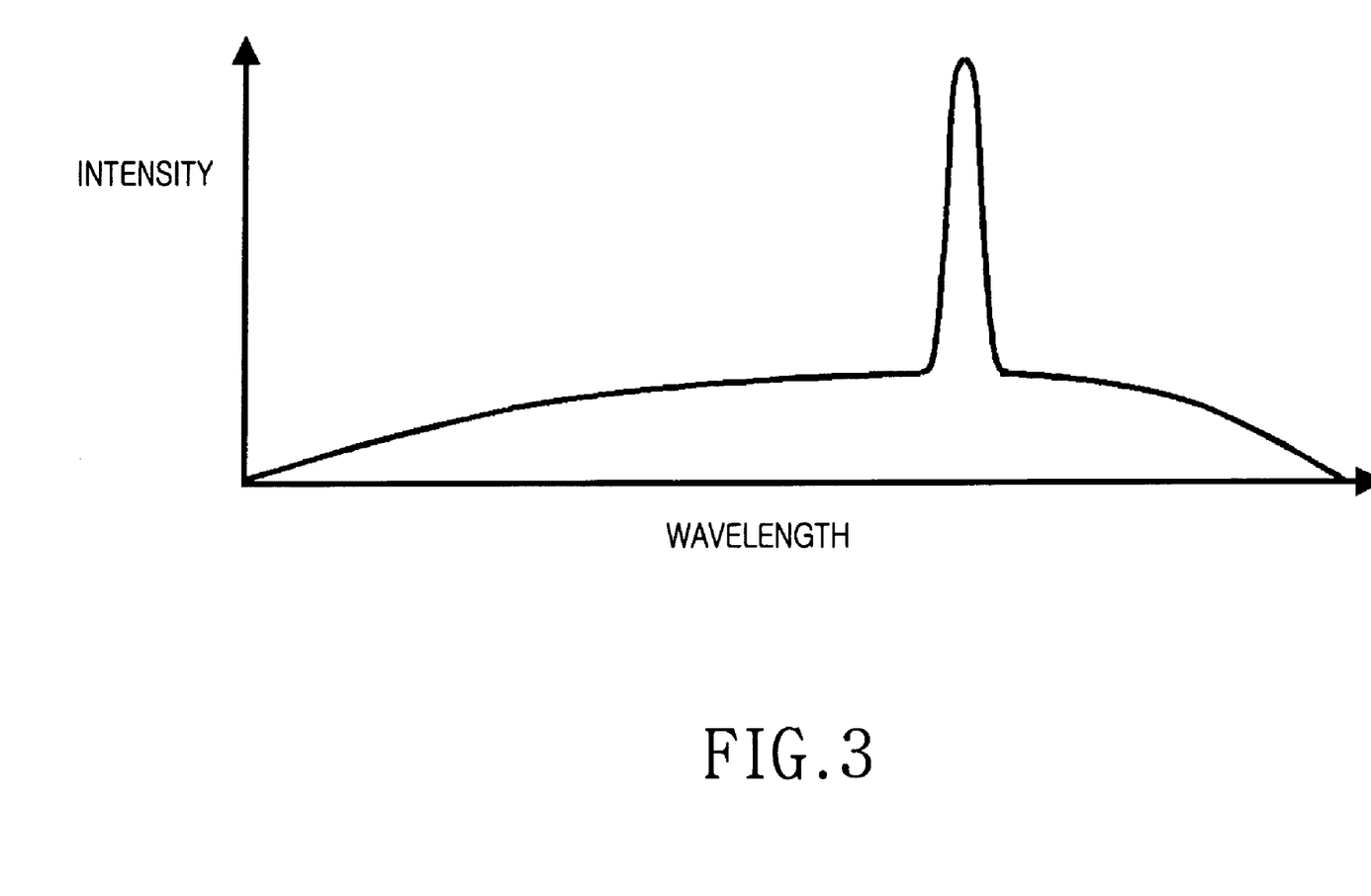
Figure 4:
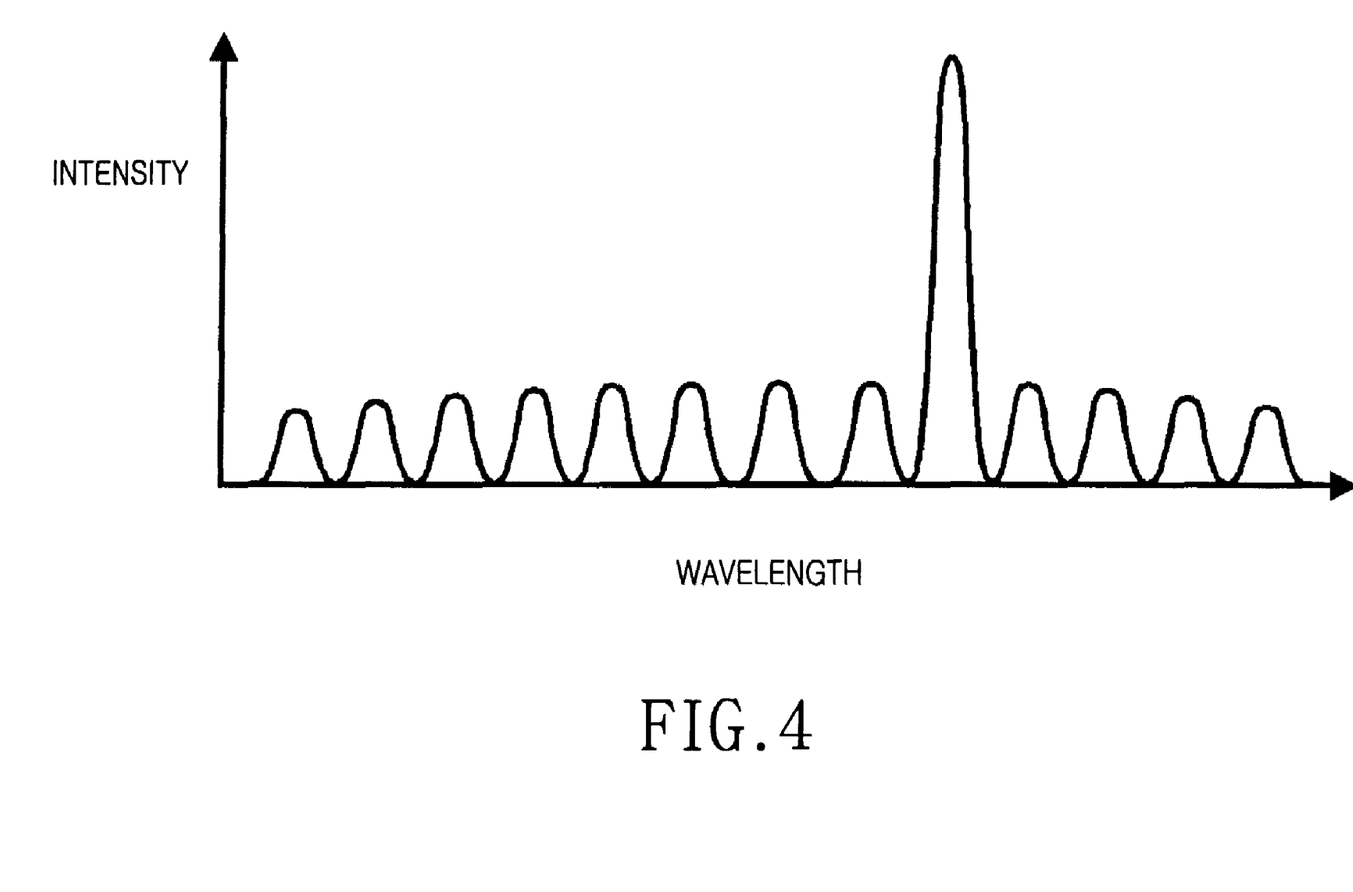

FIGS. 2 to 4 show the wavelength-locking characteristics of the Fabry-Perot laser 250. A light spectrum of the Fabry-Perot laser 250 before the wavelength-locking is illustrated in FIG. 2. Unlike the distributed feedback laser outputting a single wavelength, the Fabry-Perot lasers 250 output a plurality of wavelengths with constant wavelength intervals of about one wavelength. Note that the wavelength interval depends on the resonant wavelength of the laser diode and the gain properties of the manufacturing materials thereof.

FIG. 3 illustrates a light spectrum of an exterior optical signal to be inputted to the Fabry-Perot lasers 250, and FIG. 4 shows a light spectrum of the Fabry-Perot laser 250 wavelength-locked by the exterior optical signal. As shown, only the wavelength (i.e, the locked wavelength) of the Fabry-Perot lasers 250 equal to the exterior optical signal is amplified and outputted, while other wavelengths of the Fabry-Perot lasers 250 not equal to the exterior optical signal are suppressed. The Fabry-Perot laser 250 having the same output property as shown in FIG. 4 is known as "the wavelength-locked Fabry-Perot laser". The intensity difference between the amplified and outputted wavelength versus the suppressed and outputted wavelength is known as a side mode suppression ratio (SMSR). The more the SMSR is increased, the more the transmission performance degradation, which is due to a mode partition noise occurring at the Fabry-Perot laser 250 and a dispersion effect of the optical fiber, is decreased. Accordingly, an economical and high-speed, long distance data transmission can be realized by directly modulating the wavelength-locked Fabry-Perot laser 250.

Referring back to FIG. 1, the laser light source 230 comprises 1×N wavelength division multiplexer 240 and the N Fabry-Perot lasers 250. The wavelength division multiplxer 240 is connected to the second port of the optical circulator 110 and includes a single multiplexing port located at one side thereof and N demultiplexing ports located at the other side. In operation, the wavelength division multiplxer 240 demultiplxes the optical signal inputted to the multiplexing port and outputs the demultiplexed signals to the demultiplexing ports. Thereafter, the wavelength division multiplxer 240 spectrum-slices the optical signals inputted to the demultiplexing ports, multiplexes them, and outputs the multiplexed signals through the multiplexing port. Note that a waveguide grating router can be used as the wavelength division multiplxer 240.

Each of the Fabry-Perot lasers 250 is connected to the corresponding demultiplexing ports, then self-seeded by the demultiplxed optical signal inputted through the demultiplexing ports, thus providing the optical signal output with the seeded wavelength.

The first splitter 130 is located on the loop 120, splits a portion of the multiplexed optical signal outputted from the third port of the optical circulator 110, then outputs the splitted optical signal to the optical transmission link 260.

Now, FIGS. 5 to 8 show diverse light spectrums for illustrating the operations of the Fabry-Perot laser devices.

Figure 5:
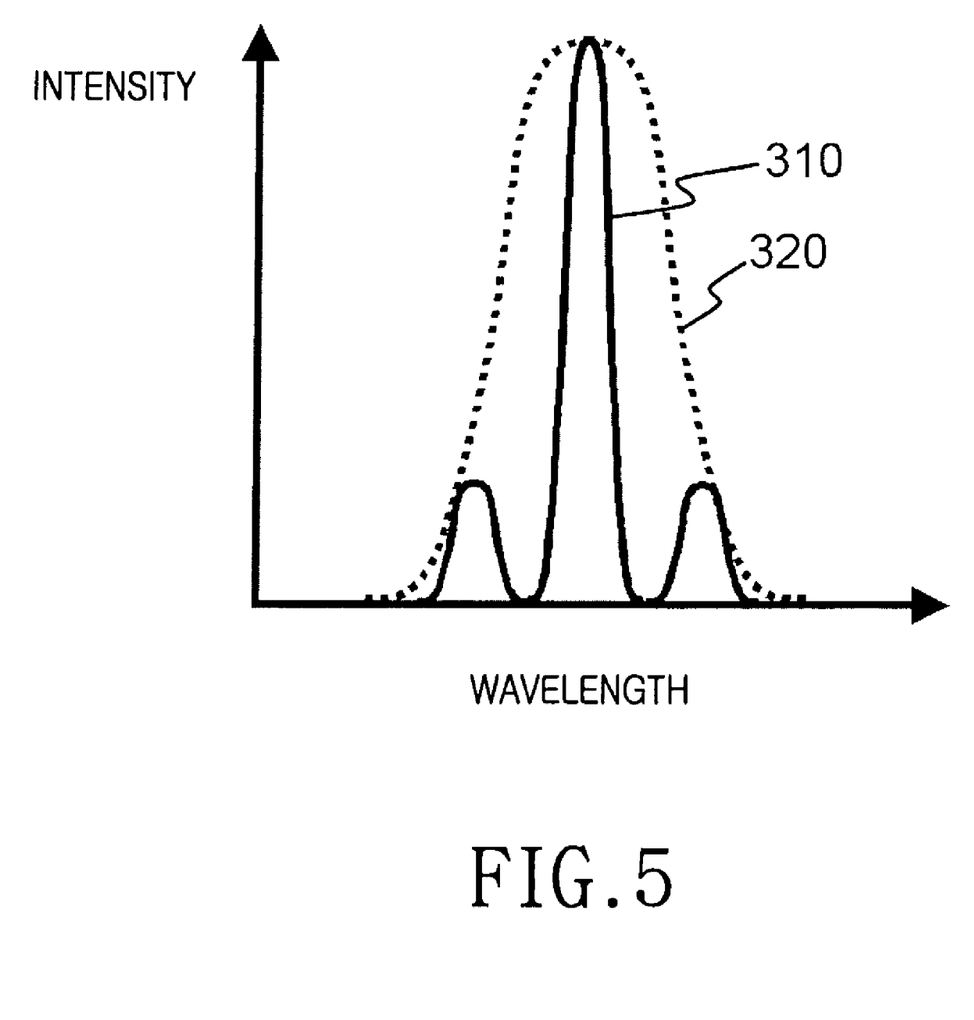
FIGS. 5 to 8 show diverse light spectrums for illustrating the operation of the Fabry-Perot laser device.
Figure 6:
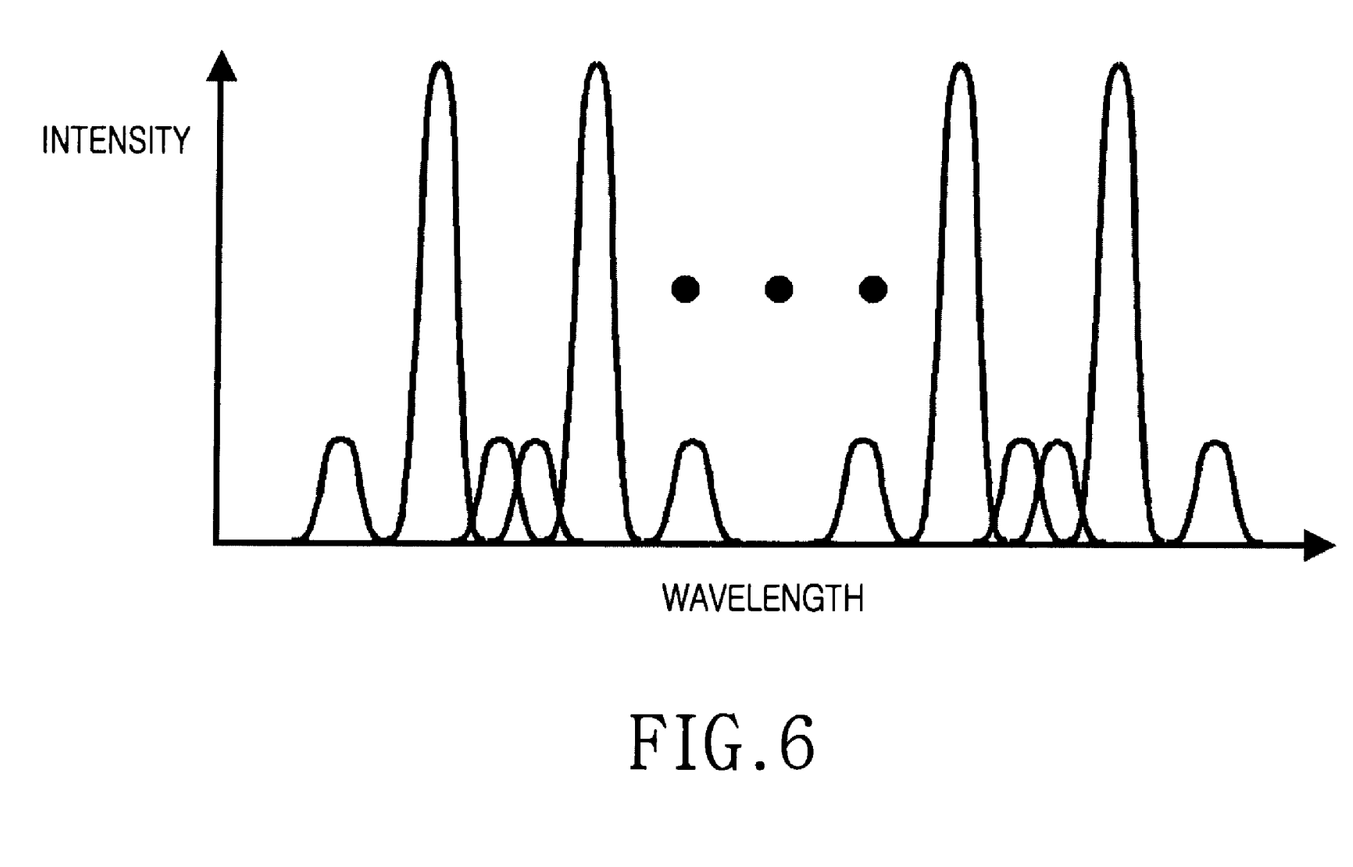
Figure 7:
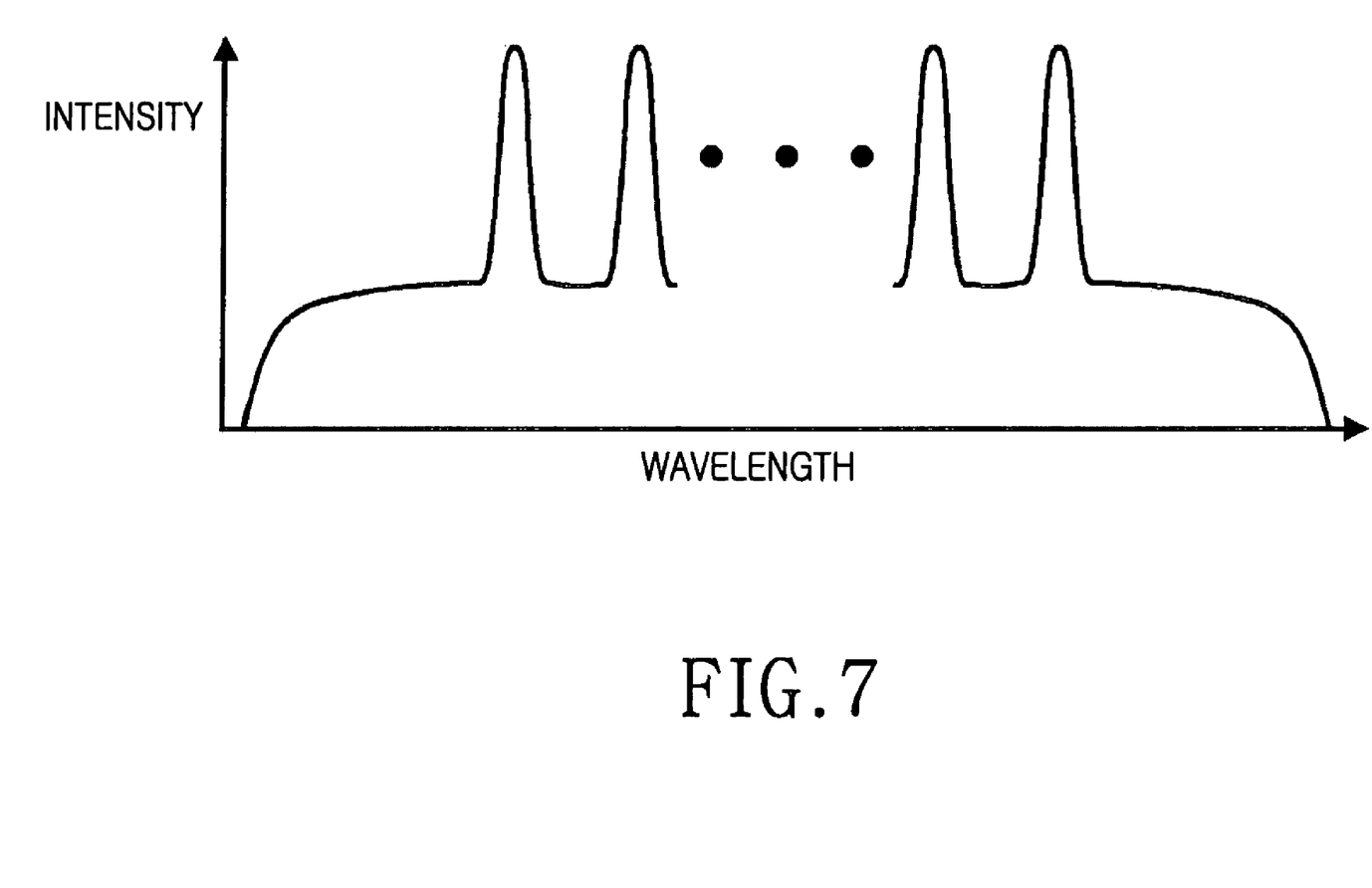

As explained earlier, the optical signals having a plurality of wavelengths outputted from the Fabry-Perot lasers 250 are inputted to the demultiplexing ports, spectrum-sliced, multiplexed, and then outputted. When the wavelength interval between the optical signals outputted from the Fabry-Perot lasers 250 is narrower than the channel interval of the wavelength division multiplxer 240, the spectrum-sliced optical signal produced from the wavelength division multiplxer 240 exhibits a light spectrum as shown in FIG. 5. In the drawing, the light spectrum 320 shown as the dotted line indicates a passband of the wavelength division multiplxer 240. As such, the multiplexed optical signal outputted through the multiplexing port of the wavelength division multiplxer 240 exhibits a light spectrum as shown in FIG. 6, and passes to the optical circulator 110 and the first splitter 130, then inputted to the optical fiber amplifier 140. Subsequently, the optical signal passes to the first optical isolator 170 and is inputted to the first amplifying optical fiber 180. The optical signal amplified by the first amplifying optical fibers 180 exhibits a light spectrum as shown in FIG. 7. The amplified optical signal passes to the second optical isolator 190 and inputted to the band-pass filter 200. Note that the passband filter 200 functions not only to eliminate the ASE noise but also to suppress the dispersion effect of the optical signal.

Figure 8:
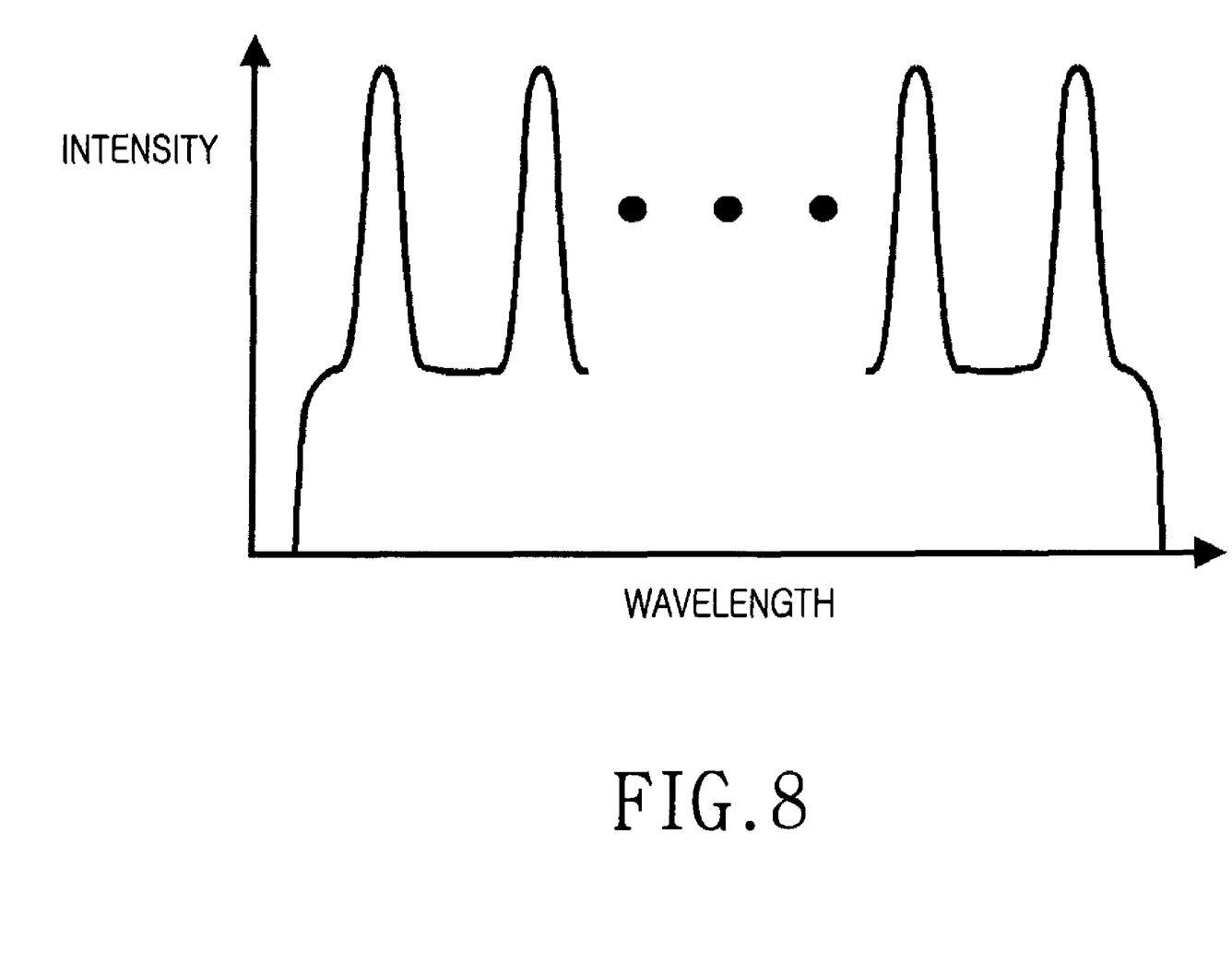

The optical signal, which passees to the passband filter 200, exhibits a light spectrum as shown in FIG. 8. The optical signal passing through the passband filter 200 and inputted to the second amplifying optical fiber 210 is re-amplified. The re-amplified, high-power multiplexed optical signal passes to the optical circulator 110 and then inputted to the wavelength division multiplexer 240 to be demultiplexed. Each of the demultiplexed high-power optical signals is inputted to the Fabry-Perot lasers 250, thus causing the wavelength-locking. The wavelength-locked optical signal repeats the above sequence, and a portion of the multiplexed, wavelength-locked optical signal is directed to the transmission link 260 via the first splitter 130 for transmission. Therefore, it can be appreciated that an expensive external modulator is not required as in the prior art as the Fabry-Perot lasers 250 directly modulates the high-speed data signal.

Figure 9:
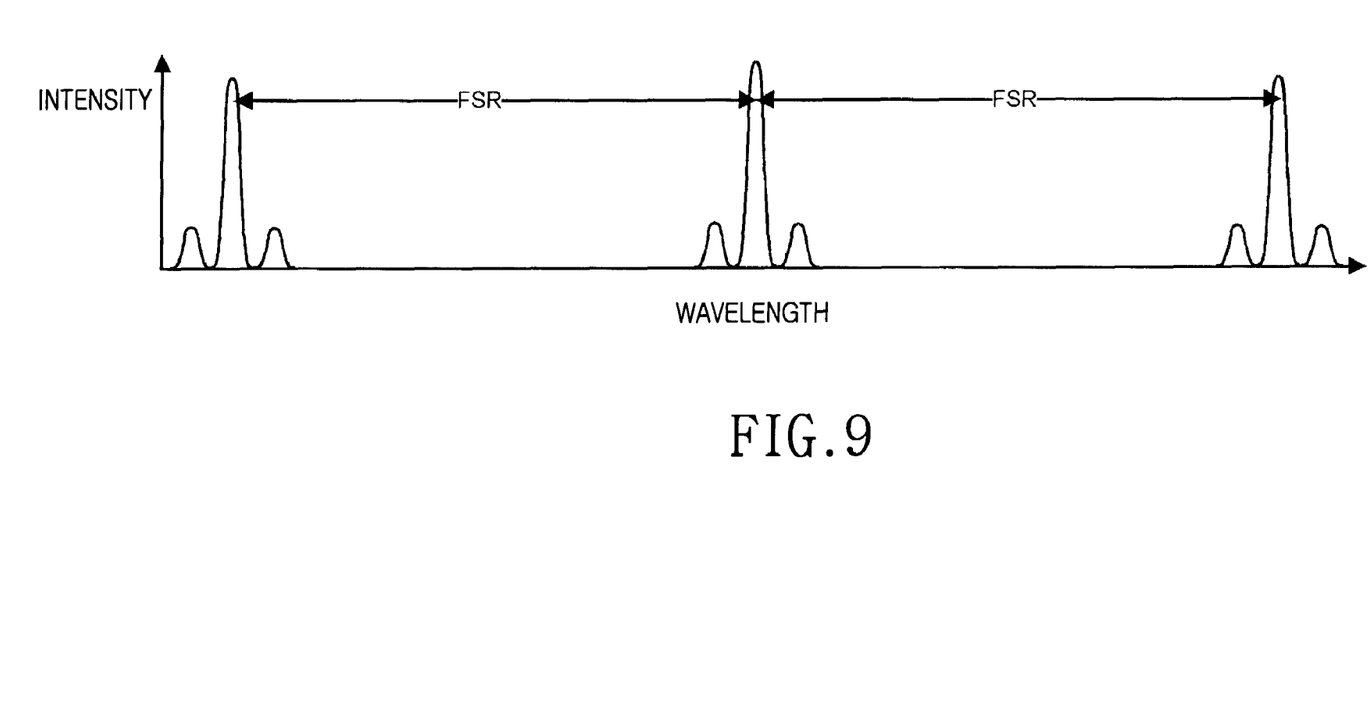
FIG. 9 illustrates a light spectrum of an optical signal inputted into a wavelength division multiplexer and then spectrum-sliced.

FIG. 9 illustrates a light spectrum of an optical signal, which is inputted into the wavelength division multiplexer 240 and then spectrum-sliced as described above. As shown, when the bandwidth of the optical signal outputted from the Fabry-Perot lasers 250 is wider than a free spectral range (FSR) of the wavelength division multiplexer 240, the spectrum of the optical signal, which is inputted into the wavelength division multiplexer 240 and then spectrum-sliced, exists in the various wavelengths spaced with the free spectral range of the wavelength division multiplexer 240. Normally, if such optical signal passes to the optical fiber amplifier 140 and inputted again to the Fabry-Perot laser 250, the optical signals seeded with the various wavelengths are outputted from the Fabry-Perot lasers 250. Here, the spectrum spread in the broad wavelength band causes a dispersion effect in the optical fiber transmission, thereby lowering a sensitivity of the receiver. Thus, it is impossible to make a high-speed, long distance data transmission. However, the band-pass filter 200 limits the spectrum band of the Fabry-Perot laser 250 to a certain band not exceeding one free spectral range of the wavelength division multiplexer 240, thereby causing each of the spectrum-sliced optical signals to be in the one wavelength only. Thus, it is possible to make a high-speed, long distance data transmission.

Preferably, the Fabry-Perot laser device as described above is further equipped with a polarization controller (PC), thereby making it possible to increase the self-seeded efficiency.

Figure 10:
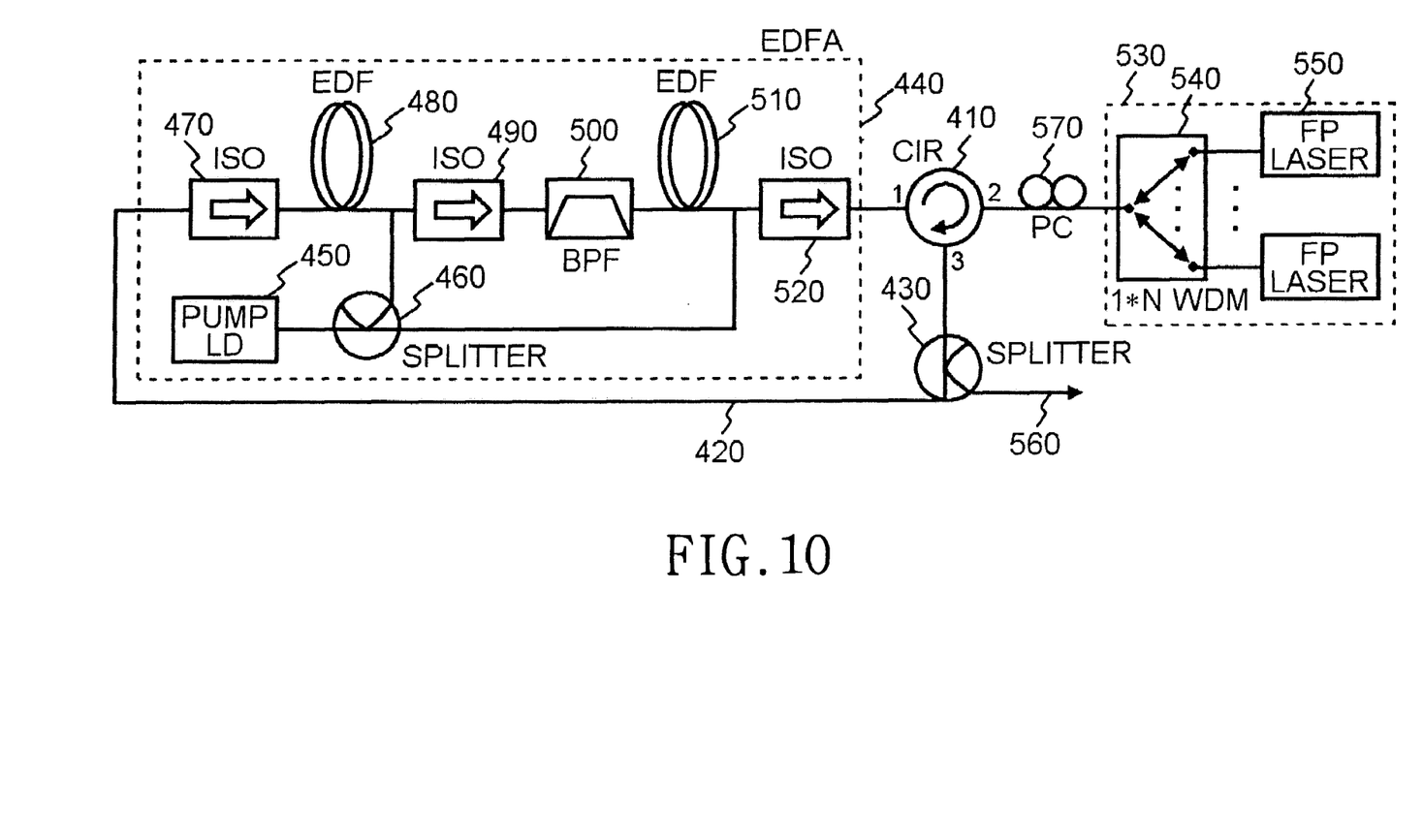
FIG. 10 shows a construction of a wavelength division multiplexed, self-seeded Fabry-Perot laser device in accordance with a preferred second embodiment of the present invention; and, FIG. 11 illustrates a construction of a wavelength division multiplexed, self-seeded Fabry-Perot laser device in accordance with a preferred third embodiment of the present invention.
Figure 11:
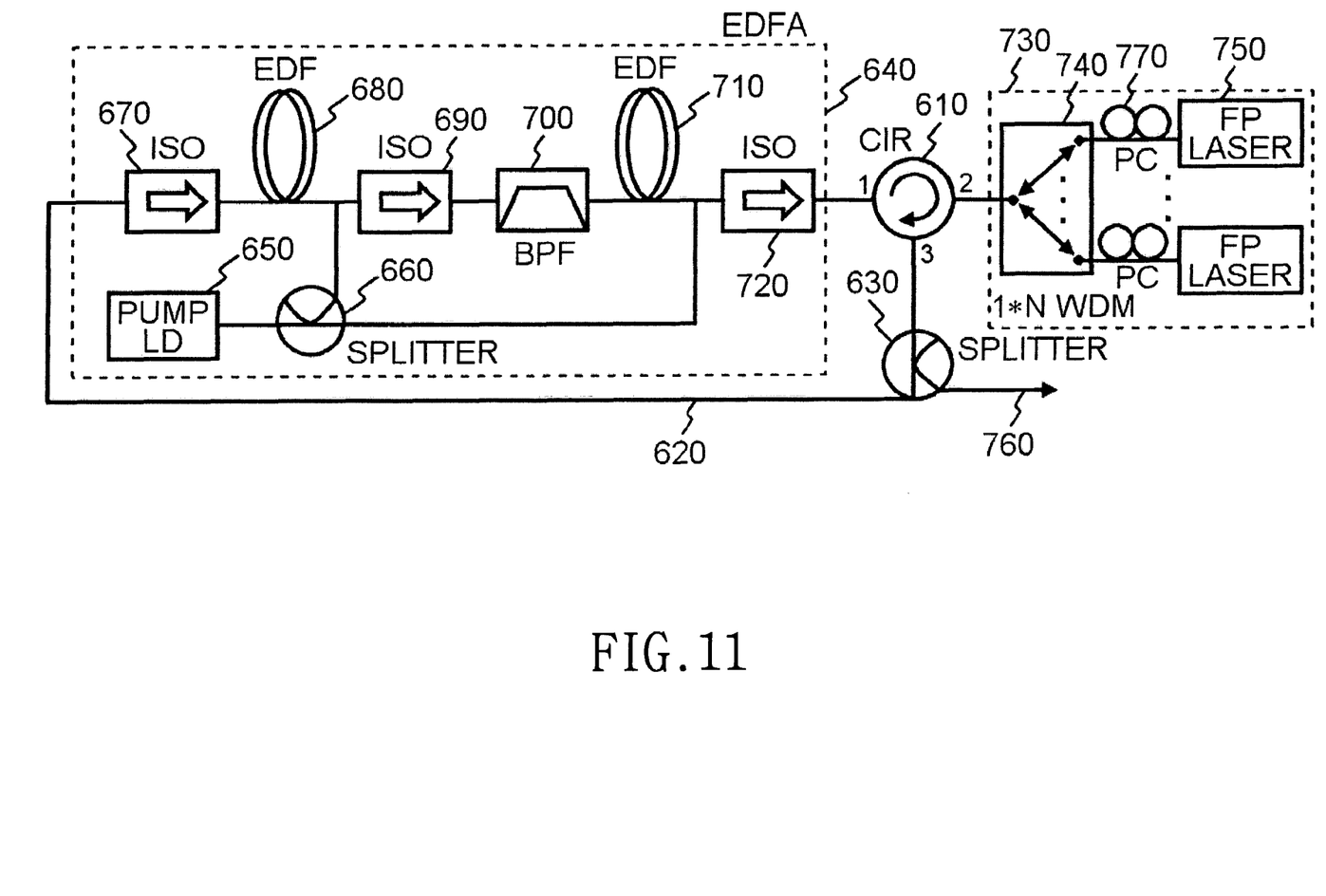

FIG. 10 and FIG. 11 show the constructions of the wavelength division multiplexed, self-seeded Fabry-Perot laser devices in accordance with the preferred second and third embodiments of the present invention, respectively. The construction and operation of the second and third embodiments are essentially the same as that described above with respect to FIG. 1., except that the self-seeded Fabry-Perot laser device is further equipped with a polarization controllers 570 and 770. Hence, the discussion of similar components described in the preceding paragraphs is omitted to avoid redundancy, as they are described with respect to FIG. 1.

Referring to FIG. 10, the polarization controller 570 is located between an optical circulator 410 and a wavelength division multiplexer 540, and controls the polarization of the multiplexed optical signal progressing between the optical circulator 410 and the wavelength division multiplexer 540 in order to increase the self-seeded efficiency, thereby making it possible to output a wavelength-locked optical signal having a higher side mode suppression ratio at the inputted signal with a lower optical power.

Similarly, referring to FIG. 11, the polarization controllers 770 are located between each of the demultiplexing ports of a wavelength division multiplexer 740 and each of the Fabry-Perot lasers 750, and control the polarization of the demultiplexed optical signal progressing between the demultiplexing ports and the Fabry-Perot lasers in order to increase the self-seeded efficiency, thus outputting a wavelength-locked optical signal having a higher side mode suppression ratio for an input signal with a lower optical power.

As described above, the wavelength division multiplexed, self-seeded Fabry-Perot laser device according to the invention not only uses an inexpensive Fabry-Perot laser but also makes it possible to directly modulate, depending on the high-speed data signal to be transmitted, without an expensive external modulator.

In addition, as the wavelength division multiplexed, self-seeded Fabry-Perot laser device according to the present invention outputs a multiplexed optical signal having a wavelength band equal to that of the wavelength division multiplexer, in the case of using a waveguide grating router as the wavelength division multiplexer, it is possible to control the wavelength band of the wavelength division multiplexed signal to be directed to the transmission link by controlling the temperature of the waveguide grating router and thus adjusting the wavelength band. Accordingly, the Fabry-Perot laser according to the present invention does not require either temperature control or wavelength selectiveness.

Moreover, in the wavelength division multiplexed, self-seeded Fabry-Perot laser device according to the present invention, only the optical signal having a wavelength selected at the optical signal outputted from each of the Fabry-Perot lasers is amplified and used in self-seeding. Then, only a portion of the optical signal of this type is directed to the transmission link, while the remaining optical signal continuously repeats the steps of amplifying and self-seeding on the loop. Thus, the optical fiber amplifier operates in a saturation state. Accordingly, since the high-power wavelength-locked optical signal is generated, the teachings of the present invention can ensure a side mode suppression ratio and an output that are adequate enough for a high-speed data transmission, while using an inexpensive Fabry-Perot laser having a lower coupling ration between the optical fiber and the laser device.

While the invention has been shown and described with reference to certain preferred embodiment thereof, it will be understood by those skilled in the art that various changes in form and details may be made therein without departing from the spirit and scope of the invention as defined by the appended claims.

What is claimed is:

1. A Fabry-Perot laser device for providing a wavelength-division-multiplexed optical signal to an optical transmission link, comprising:
   an optical circulator having a plurality of ports for outputting light circulating in an optical waveguide loop;
   at least one optical fiber amplifier disposed in the optical waveguide loop for amplifying light circulating in the optical waveguide loop;
   a laser light source coupled to the optical circulator via one of the plurality of ports to receive light circulating in the optical waveguide loop and, a wavelength division multiplexer for demultiplexing light received from the optical circulator via one of the plurality of ports; and, a plurality of Fabry-Perot lasers coupled to receive the demultiplexed light and for outputting wavelength-locked light signals having self-seeded wavelengths back to the wavelength division multiplexer for multiplexing the wavelength-locked light back to the optical circulator; and,
   a first splitter coupled to the optical circulator via one of the plurality of ports for splitting a portion of the light outputted from the circulator to the optical transmission link.

2. The Fabry-Perot laser device of claim 1, wherein a wavelength interval between the light signals from the plurality of Fabry-Perot lasers is substantially narrower than a channel interval of the wavelength division multiplexer.

3. The Fabry-Perot laser device of claim 1, wherein the wavelength division multiplexer comprises a waveguide grating router.

4. The Fabry-Perot laser device of claim 1, wherein the optical fiber amplifier comprises:
   first and second amplifying optical fibers connected in series in the optical waveguide loop for amplifying the circulating light using a stimulated emission of rare earth elements;
   a pumping light source outputting a pumping light having a preset wavelength to the first and second amplifying optical fibers; and,
   a second splitter for splitting the pumping light to the first and second amplifying optical fibers, respectively.

5. The Fabry-Perot laser device of claim 4, wherein the first and second amplifying optical fibers comprises erbium-doped fibers.

6. The Fabry-Perot laser device of claim 4, wherein the pumping light source comprises a laser diode.

7. The Fabry-Perot laser device of claim 4, wherein the second splitter splits the pumping light so that the first and second amplifying optical fibers are reversely pumped by the pumping light source.

8. The Fabry-Perot laser device of claim 4, wherein the optical fiber amplifier further comprises a first optical isolator coupled between the first splitter and the first amplifying optical fiber, a second optical isolator coupled between the first and second amplifying optical fibers, and a third optical isolator coupled between the second amplifying optical fiber and the optical circulator for allowing the circulating light to pass therethrough in a forward direction while suppressing a light progressing in a reverse direction.

9. The Fabry-Perot laser device of claim 4, further comprising a band-pass filter having a bandwidth equal to the circulating light and located between the first and second amplifying optical fibers for eliminating an amplified spontaneous emission noise deviating from the circulating light.

10. The Fabry-Perot laser device of claim 9, wherein the band-pass filter is further operative to suppress dispersion effect from the circulating light.

11. The Fabry-Perot laser device of claim 1, further comprising a polarization controller coupled between the optical circulator and the wavelength division multiplexer for controlling polarization of the multiplexed optical signal progressing between the optical circulator and the wavelength division multiplexer.

12. The Fabry-Perot laser device of claim 1, further comprising a plurality of polarization controllers between the wavelength division multiplexer and the plurality of Febry-Perot lasers for controlling polarization of the demultiplexed light by the wavelength division multiplexer.

* * * * *

UNITED STATES PATENT AND TRADEMARK OFFICE
CERTIFICATE OF CORRECTION

PATENT NO. : 7,149,431 B2 Page 1 of 1
APPLICATION NO. : 10/628005
DATED : December 12, 2006
INVENTOR(S) : Dae-Kwang Jung et al.

It is certified that error appears in the above-identified patent and that said Letters Patent is hereby corrected as shown below:

Title Page
Item [30], Foreign Application Priority Number, should read as follows:

--10/2002-0062820.--

Signed and Sealed this

Twenty-fourth Day of April, 2007

JON W. DUDAS
*Director of the United States Patent and Trademark Office*